United States Patent
Lee

(10) Patent No.: US 7,997,299 B2
(45) Date of Patent: Aug. 16, 2011

(54) STRUCTURE OF BUBBLE PREVENTION BUFFER TANK OF FUEL CELL VEHICLE

(75) Inventor: Seung Yong Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 735 days.

(21) Appl. No.: 11/633,884

(22) Filed: Dec. 4, 2006

(65) Prior Publication Data

US 2008/0092963 A1 Apr. 24, 2008

(30) Foreign Application Priority Data

Oct. 20, 2006 (KR) ................ 10-2006-0102307

(51) Int. Cl.
*B01D 19/00* (2006.01)
*E03B 7/07* (2006.01)

(52) U.S. Cl. ............ 137/592; 137/545; 96/219; 96/220

(58) Field of Classification Search .......... 96/155, 96/219, 220; 137/592, 574, 576, 545; 220/734, 220/88.2

See application file for complete search history.

(56) References Cited

U.S. PATENT DOCUMENTS

| | | | |
|---|---|---|---|
| 2,920,648 A * | 1/1960 | Sheffer ............... | 137/582 |
| 4,987,852 A * | 1/1991 | Sakai et al. ............ | 118/603 |
| 5,293,895 A * | 3/1994 | Grove et al. ........... | 137/154 |
| 6,116,170 A * | 9/2000 | Yamada et al. ......... | 110/233 |
| 6,216,646 B1 | 4/2001 | Smith et al. | |
| 6,562,107 B2 * | 5/2003 | Purdom et al. ......... | 95/241 |
| 2003/0203258 A1* | 10/2003 | Yang et al. ............ | 429/25 |
| 2005/0247198 A1* | 11/2005 | Kent .................... | 95/241 |

FOREIGN PATENT DOCUMENTS

| | | |
|---|---|---|
| JP | 59-201918 | 11/1984 |
| JP | 61189943 A * | 8/1986 |
| JP | 09-306478 | 11/1997 |
| JP | 10-003902 | 1/1998 |
| KR | U 1993-0014605 | 7/1993 |
| KR | U 1995-0019312 | 7/1995 |
| KR | U 1997-0062832 | 12/1997 |
| KR | 10-2006-0048831 | 5/2006 |

* cited by examiner

*Primary Examiner* — Stephen M Hepperle
*Assistant Examiner* — Atif Chaudry
(74) *Attorney, Agent, or Firm* — Edwards Angell Palmer & Dodge LLP; Kongsik Kim

(57) ABSTRACT

A structure of a bubble prevention buffer tank of a fuel cell vehicle is provided that comprises at least one mesh and at least one lattice inside the buffer tank so as to remove air bubbles inside the buffer tank by breaking the air bubbles.

9 Claims, 3 Drawing Sheets

[FIG. 1]
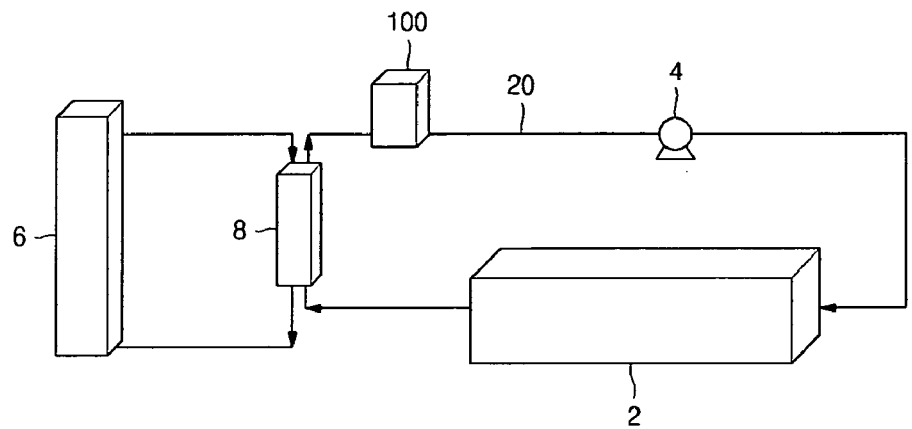
[FIG. 2]
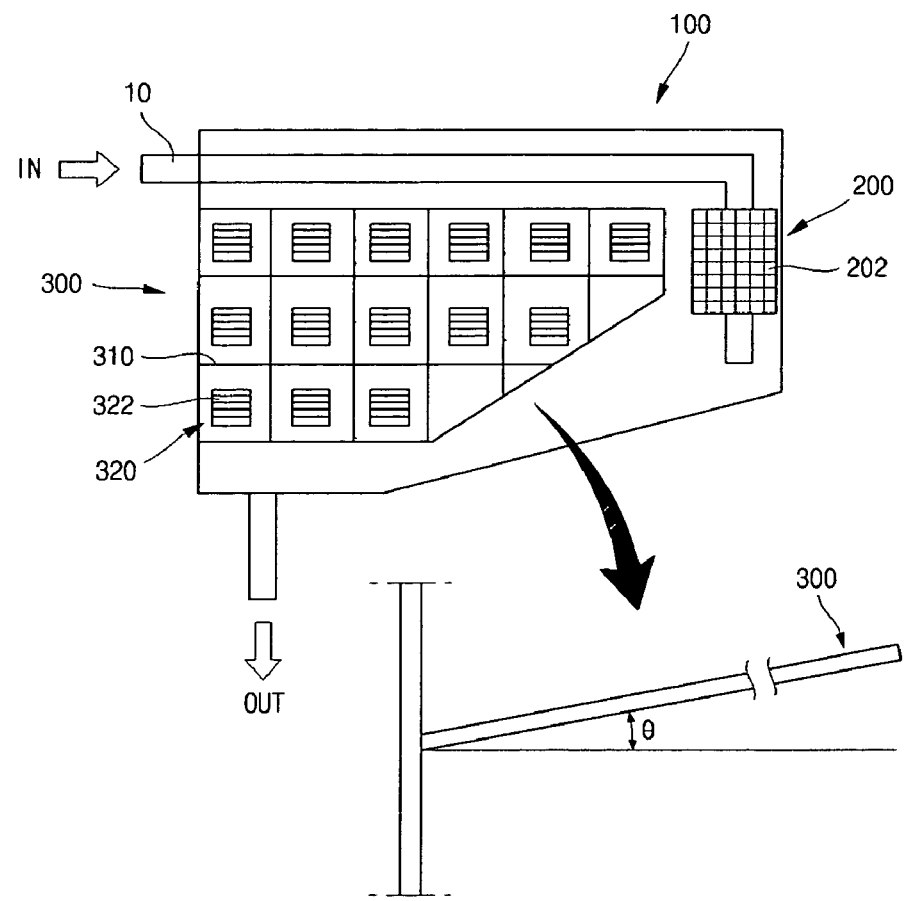

[FIG. 3A]
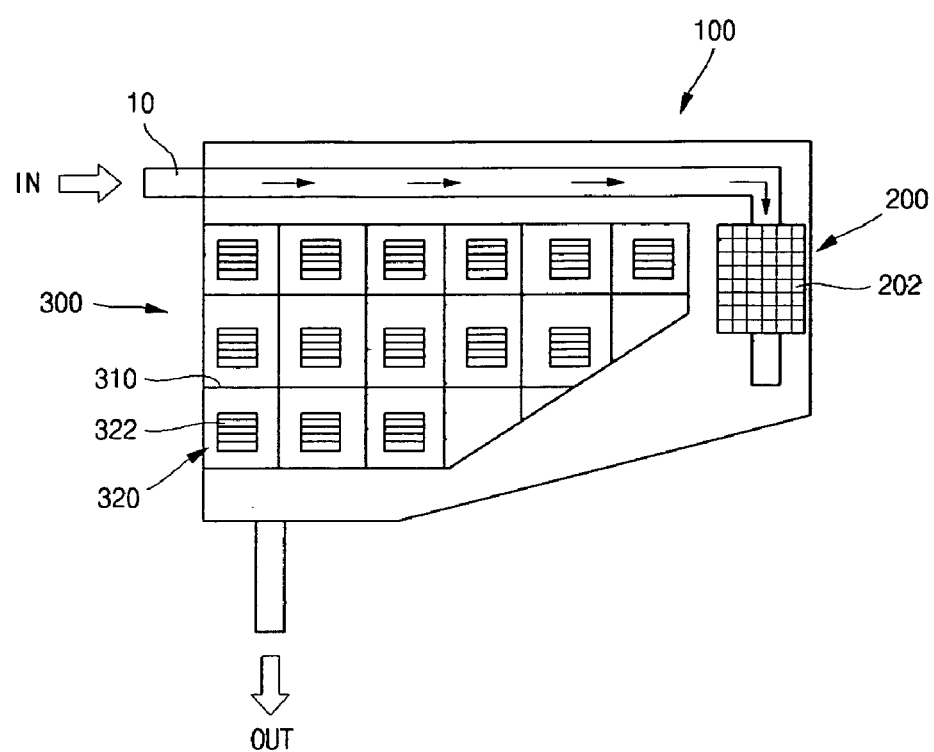

[FIG. 3B]
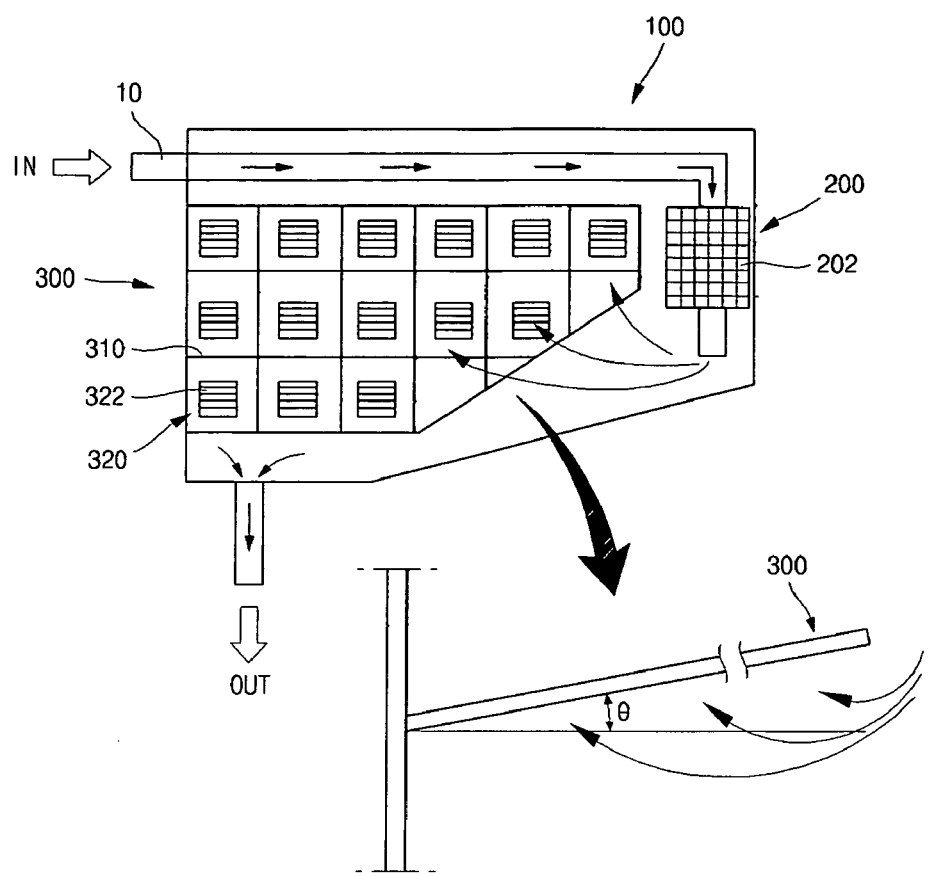

STRUCTURE OF BUBBLE PREVENTION BUFFER TANK OF FUEL CELL VEHICLE

CROSS-REFERENCE TO RELATED APPLICATION

This application claims priority to and the benefit of Korean Patent Application No. 10-2006-0102307 filed in the Korean Intellectual Property Office on Oct. 20, 2006, the entire contents of which are incorporated herein by reference.

BACKGROUND OF THE INVENTION (a) Field of the Invention

The present invention relates to a structure of a bubble prevention buffer tank of a fuel cell vehicle for reducing generation of air bubbles in a buffer tank.

(b) Description of the Related Art

Generally, the stack operating temperature a fuel cell system is 60° C. to 70° C. Thus, a great amount of coolant and a radiator having a great heat radiating capacity are needed. When a great amount of coolant flows into a buffer tank in a coolant circulation loop, surrounding air is sucked into a coolant tank, and this deteriorates cooling capacity and causes cavitation phenomenon in the pump so as to damage the pump.

In order to dissipate reaction heat, the stack must be cooled by a coolant. The most common coolant for a fuel cell stack is DI-water which humidifies the stack. In such case where a coolant directly humidifies the inner part of stack, water balance is required to be suitably adjusted for humidifying. To ensure to provide water balance in the stack, decreasing or increasing the total amount of flow of coolant must be possible. In order to meet this requirement, a buffer tank must be provided in a cooling loop.

Since great amount of coolant inflows to or outflows from the buffer tank while one side of the buffer tank is exposed to atmospheric pressure, air bubbles on the surface of coolant may be sucked and the bubbles may circulate in a cooling loop. The bubbles circulating in the cooling loop may damage blades of the coolant pump and may cause noises.

There is thus a need for a structure of a bubble prevention buffer tank that can reduce generation of air bubbles in a buffer tank so as to prevent malfunction of a coolant pump and to stably maintain the performance of a stack.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

In one aspect, the present invention provides a structure of a bubble prevention buffer tank of a fuel cell vehicle, comprising at least one mesh and at least one lattice inside the buffer tank so as to remove air bubbles inside the buffer tank by breaking the air bubbles.

Preferably, the meshes have at least two different sizes. Also preferably, the lattices have at least two different sizes.

In a preferred embodiment, one of the meshes may be provided at one end portion of an inlet pipe extended into an inner portion of the buffer tank.

Preferably, the mesh provided at one end portion of the inlet pipe has a mesh size larger than that of the other meshes.

In another aspect, the present invention provides a structure of a bubble prevention buffer tank of a fuel cell vehicle comprising: a first bubble prevention part provided at one end portion of an inlet pipe extended into an inner space of the buffer tank so as to remove the air bubbles introduced into the buffer tank via the inlet pipe; and a second bubble prevention part provided inside the buffer tank in a longitudinal direction thereof so as to remove the air bubbles supplied into the buffer tank via the first bubble prevention part.

Preferably, the first bubble prevention part may be provided at an inner lower portion of the buffer tank.

In a preferred embodiment, the first bubble prevention part may be provided with a pipe-type first mesh.

Preferably, the second bubble prevention part may be upwardly slanted toward the first bubble prevention part.

A preferred second bubble prevention part may be made of stainless steel or plastic material.

Suitably, the second bubble prevention part may be provided with dividing lattices which are arranged in a matrix shape with a constant distance between each other.

Also suitably, each of the dividing lattices of the second bubble prevention part may be provided with a sub lattice for making the surface of coolant supplied through the first bubble prevention part uniform and preventing air bubbles being generated.

Preferably, the sub mesh which is provided to the sub lattice may be designed to be smaller than the first mesh which is provided to the first bubble prevention part.

In a further aspect, motor vehicles are provided that comprise a described structure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like. The present structures will be particularly useful with a wide variety of motor vehicles.

Other aspects of the invention are discussed infra.

BRIEF DESCRIPTION OF THE DRAWINGS

The present invention will be better understood from reading the description which follows, given by way of non-limiting example, with reference to the attached drawings.

FIG. 1 is a diagram showing a cooling loop including a bubble prevention buffer tank for a fuel cell vehicle according to an exemplary embodiment of the present invention.

FIG. 2 is a drawing showing a structure of a bubble prevention buffer tank for a fuel cell vehicle according to an exemplary embodiment of the present invention.

FIG. 3A and FIG. 3B are drawings showing operations of a structure of a bubble prevention buffer tank for a fuel cell vehicle according to an exemplary embodiment of the present invention.

Reference numerals set forth in the Drawings includes reference to the following elements as further discussed below:

| | |
|---|---|
| 2: stack | 4: coolant pump |
| 20: coolant circulation line | 100: buffer tank |
| 200: first bubble prevention part | 202: first mesh |
| 300: second bubble prevention part | 310: dividing lattice |
| 320: sub lattice | 322: sub mesh |

DETAILED DESCRIPTION

An exemplary embodiment of the present invention will hereinafter be described in detail with reference to the accompanying drawings.

FIG. 1 is a diagram showing a cooling loop including a bubble prevention buffer tank for a fuel cell vehicle according to an exemplary embodiment of the present invention. FIG. 2 is a drawing showing a structure of a bubble prevention buffer tank for a fuel cell vehicle according to an exemplary embodiment of the present invention. FIG. 3A and FIG. 3B are drawings showing operations of a structure of a bubble prevention buffer tank for a fuel cell vehicle according to an exemplary embodiment of the present invention.

Referring to FIG. 1 to FIG. 3B, a cooling line of a fuel cell vehicle comprises a first bubble prevention part 200 provided at one end portion of an inlet pipe 10 extended into an inner space of a buffer tank 100 so as to remove bubbles which may be generated while coolant flows into the buffer tank 100 along a coolant circulation line 20, and a second bubble prevention part 300 provided inside the buffer tank 100 in a longitudinal direction thereof so as to remove bubbles contained in coolant which is supplied into the buffer tank 100 via the first bubble prevention part 200.

A coolant pump 4 is installed at the coolant circulation line 20 which connects the stack 2 and the buffer tank 100, so that the coolant circulating in the coolant circulation line 20 may flow smoothly. In addition, the circulation line is provided with a radiator 6 and a heat exchanger 8.

The inlet pipe 10 which is extended into the buffer tank 100 is extended along an inner wall of the buffer tank 100, and one end portion thereof is bent according to a shape of the buffer tank 100.

The first bubble prevention part 200 may preferably be provided at an inner lower portion of the buffer tank 100.

The first bubble prevention part 200 also may preferably be provided with a pipe-type first mesh 202.

It is preferable that the second bubble prevention part 300 is upwardly slanted toward the first bubble prevention part 200. In particular, for example, one end portion of the second bubble prevention part 300 is slanted by 30° to 45°, so the coolant supplied through the inlet pipe 10 can flow into a lower portion of the second bubble prevention part 300.

The second bubble prevention part 300 may suitably be made of stainless steel or plastic material. If the second bubble prevention part 300 is made of stainless steel, it can be fixed to an inner side the buffer tank 100 by welding. If it is made of plastic material, it can be fixed to an inner side of the buffer tank 100 by a separate fixing member. Various kinds and shapes of fixing members can be used. For example, a guide groove can be used. Also, a hooking structure can be used to hook the second bubble prevention part.

The second bubble prevention part 300 may be provided with dividing lattices 310 which are arranged in a matrix shape with a constant distance therebetween. The second bubble prevention part 300 is formed in a plate shape. The area of one of the dividing lattices 310 can be equal or similar to that of the other lattices.

A sub lattice 320 is provided to the dividing lattice 310 of the second bubble prevention part 300 so as to make the surface of the coolant supplied through the first bubble prevention part 200 uniform and prevent air bubbles from being generated.

A sub mesh 322 is formed in the sub lattice 320. It is configured to have a size less than that of the first mesh 202 provided to the first bubble prevention part 200. It is preferable that the sub mesh 322 is formed in a lattice shape in a vertical direction, in a horizontal direction, or in both directions.

Operations of a structure of a bubble prevention buffer tank of a fuel cell vehicle according to an exemplary embodiment of the present invention will be explained hereinafter with reference to the drawings.

As shown in FIG. 1, the coolant supplied to the stack 2 through the coolant pump 4 absorbs the heat generated in the stack 2 while passing through a plurality of cells (not shown) which are provided to the stack 2. The coolant is then supplied to the coolant circulation line 20 connected to the stack 2. In particular, it is then supplied to the heat exchanger 8 so as to perform heat exchange and then supplied to the inlet pipe 10 of the buffer tank 100. The coolant passing through the buffer tank 100 is again supplied to the stack 2 via the coolant pump 4.

In addition, another cooling of a fuel cell vehicle is performed by cooling high-temperature coolant with the radiator 6 associated with the heat exchanger 8.

Referring to FIG. 2 and FIG. 3A, the coolant supplied to the inlet pipe 10 moves along the arrows and is accelerated. While the surface of the coolant supplied through the inlet pipe 10 becomes lower, the air surrounding the inlet pipe 10 of the buffer tank 100 is flowed into the buffer tank 100 together with the rapid flow of coolant. The air supplied in this way is mixed with coolant, thereby generating a plurality of bubbles in the coolant.

As described above, inflow of air contained in the coolant supplied through the inlet pipe 10 is maximally blocked by the first mesh 202 of the first bubble prevention part 200. Since the first bubble prevention part 200 is provided with the pipe type first mesh 202, it can preliminarily remove air bubbles by breaking the air bubbles contained in the coolant having an increased moving speed. In addition, rapid lowering of the surface of the coolant supplied into the buffer tank 100 at a high speed can be prevented.

Referring to FIG. 3B, air bubbles broken into smaller bubbles while passing through the first bubble prevention part 200 arise, thereby being supplied to a lower portion of the second bubble prevention part 300. Since the coolant is supplied to the lower portion of the second bubble prevention part 300, air bubbles passing through the first mesh 202 arise to the second bubble prevention part 300 so as to move toward the dividing lattices 310 which are arranged in a matrix shape. Some of the air bubbles supplied to the dividing lattice 310 collide with the sub lattice 320 and disappear, and the remaining air bubbles move toward an upper portion of the second bubble prevention part 300. The second bubble prevention part 300 prevents the surface of the coolant having passed the first bubble prevention part 200 from being fluctuated, thereby maintaining the surface of coolant to be stable.

Since the sub mesh 322 provided to the sub lattice 320 is smaller than the first mesh 202 provided to the first bubble prevention part 200, it can further remove the air bubbles having passed the first mesh 202.

Since the second bubble prevention part 300 is made of stainless steel or plastic material, corrosion of the second bubble prevention part 300 by coolant can be prevented. The second bubble prevention part 300 can thus be used for a long time without corrosion or crack.

As described above, structures according to the prevention can reduce or prevent the generation of air bubbles, thereby preventing the occurrence of cavitation phenomenon in a coolant pump.

Furthermore, the present structures allow less amount of air bubbles to be contained in a coolant, thereby enhancing overall cooling performance of the stack, decreasing the noise caused by coolant flow, and enhancing durability of the cooling parts.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A structure of a bubble prevention buffer tank of a fuel cell vehicle, comprising:
    an inlet pipe extended into the buffer tank for introducing the coolant into the buffer tank;
    a first bubble prevention part provided in the buffer tank and coupled to one end portion of the inlet pipe, the first bubble prevention part comprising a mesh for removing the air bubbles introduced into the first bubble prevention part via the inlet pipe; and
    a second bubble prevention part provided in the buffer tank and disposed in a longitudinal direction of the buffer tank so as to remove the air bubbles discharged from the first bubble prevention part into the buffer tank, the second bubble prevention part comprising a plurality of sub-meshes, and a lower end portion of the second bubble prevention part being upwardly slanted toward the first bubble prevention part,
    wherein the first wherein the first and second bubble prevention part are arranged such that the air bubbles contained in the coolant discharged from the first bubble prevention part are arisen and then introduced into the second bubble prevention part through the slanted end portion.

2. The structure of claim 1, wherein the first bubble prevention part is provided at an inner lower portion of the buffer tank.

3. The structure of claim 1, wherein the first bubble prevention part is provided with a pipe-type first mesh.

4. The structure of claim 1, wherein the second bubble prevention part is made of stainless steel or plastic material.

5. The structure of claim 1, wherein the second bubble prevention part is provided with dividing lattices which are arranged in a matrix shape with a constant distance between each other.

6. The structure of claim 5, wherein each of the dividing lattices of the second bubble prevention part is provided with a sub lattice for making the surface of coolant supplied through the first bubble prevention part uniform and preventing air bubbles from being generated.

7. The structure of claim 6, wherein the sub mesh provided to the sub lattice is smaller than the first mesh provided to the first bubble prevention part.

8. The structure of claim 1 wherein the second bubble prevention part comprise a mesh structure distinct from the mesh of the first bubble prevention part.

9. The structure of claim 1 wherein the second bubble prevention part comprises a lattice structure and mesh within the lattice structure.

\* \* \* \* \*